(12) United States Patent
Kim et al.

(10) Patent No.: US 10,345,824 B2
(45) Date of Patent: Jul. 9, 2019

(54) OPTIMUM CRUISE CLIMB TRACKING FOR REDUCED FUEL CONSUMPTION USING VERTICAL AND LATERAL NAVIGATION

(71) Applicant: The Boeing Company, Chicago, IL (US)

(72) Inventors: Geun Il Kim, Bellevue, WA (US); Jose Alexandre Tavares Guerreiro Fregnani, Sao Jose dos Campos (BR); Timothy Charles Rohr, Seattle, WA (US)

(73) Assignee: The Boeing Company, Chicago, IL (US)

( * ) Notice: Subject to any disclaimer, the term of this patent is extended or adjusted under 35 U.S.C. 154(b) by 313 days.

(21) Appl. No.: 15/256,227

(22) Filed: Sep. 2, 2016

(65) Prior Publication Data

US 2018/0067500 A1    Mar. 8, 2018

(51) Int. Cl.
| | |
|---|---|
| *G05D 1/00* | (2006.01) |
| *G05D 1/04* | (2006.01) |
| *G05D 1/06* | (2006.01) |
| *G08G 5/00* | (2006.01) |
| *B64C 13/16* | (2006.01) |

(52) U.S. Cl.
CPC .......... *G05D 1/0615* (2013.01); *B64C 13/16* (2013.01); *G05D 1/0066* (2013.01); *G05D 1/046* (2013.01); *G05D 1/0653* (2013.01); *G08G 5/0013* (2013.01); *G08G 5/0021* (2013.01); *G08G 5/0052* (2013.01); *G05D 1/005* (2013.01); *G05D 1/0661* (2013.01); *G05D 1/0676* (2013.01)

(58) Field of Classification Search
CPC .... G05D 1/0615; G05D 1/0653; G05D 1/046; G05D 1/0066; G05D 1/0676; G05D 1/0661; G05D 1/005; G08G 5/0052; G08G 5/0021; G08G 5/0013; B64C 13/16
See application file for complete search history.

(56) References Cited

U.S. PATENT DOCUMENTS

| | | | | |
|---|---|---|---|---|
| 5,574,647 | A * | 11/1996 | Liden | G05D 1/0615 701/10 |
| 8,798,815 | B1 * | 8/2014 | Burgin et al. | G08G 5/0021 701/9 |
| 9,026,275 | B1 * | 5/2015 | Young et al. | G08G 5/0021 701/11 |
| 2012/0078450 | A1 * | 3/2012 | Marche et al. | G05D 1/0005 701/6 |
| 2014/0018980 | A1 * | 1/2014 | Bollapragada et al. | G05D 1/0005 701/10 |

(Continued)

OTHER PUBLICATIONS

Folse et al. "Cruise Altitude and Speed Optimization Implemented in a Pilot Decision Support Tool." 16th AIAA Aviation Technology, Integration, and Operations Conference, 2016, 10 pages.

(Continued)

*Primary Examiner* — Dale W Hilgendorf
(74) *Attorney, Agent, or Firm* — Yee & Associates, P.C.

(57) ABSTRACT

A method of optimizing a cruise climb of an aircraft. The method includes using vertical navigation and lateral navigation to track the cruise climb; and using tracking of the cruise climb to adjust a climb rate of the aircraft to match an optimal climb rate.

15 Claims, 13 Drawing Sheets

(56) References Cited

U.S. PATENT DOCUMENTS

2017/0090482 A1* 3/2017 Zannnnit-Mangion et al. ............
G05D 1/0005

OTHER PUBLICATIONS

Dalmau et al., "Fuel and time savings by flying continuous cruise climbs Estimating the benefit pools for maximum range operations," Elsevier Ltd., Transportation Research Part D 35, 2015, 10 pages.

* cited by examiner

OPTIMUM CRUISE CLIMB TRACKING FOR REDUCED FUEL CONSUMPTION USING VERTICAL AND LATERAL NAVIGATION

BACKGROUND INFORMATION

1. Field

This disclosure relates to systems and methods for operating aircraft in a more fuel-efficient manner.

2. Background

According to the International Air Transport Association, in the year 2008, fuel represented more than thirty percent of the total operating cost of the air transport industry. Thus, commercial air operators and manufacturers seek techniques and technologies to minimize aircraft fuel consumption.

SUMMARY

An illustrative embodiment of the present disclosure provides for a method of optimizing a cruise climb of an aircraft. The method includes using vertical navigation and lateral navigation to track the cruise climb; and using tracking of the cruise climb to adjust a climb rate of the aircraft to match an optimal climb rate.

The illustrative embodiments also provide for a method of operating an aircraft. The method includes computing an optimal climb rate profile representing optimized fuel consumption by the aircraft during a cruise climb to an optimal altitude where fuel consumption is minimized during a cruise. The climb rate profile is represented on a graph of altitude versus ground distance. The climb rate profile represents an optimal climb rate. The method also includes initiating, after computing, a cruise climb for the aircraft. The method also includes tracking a three-dimensional position of the aircraft using both vertical navigation tracking of the aircraft and lateral navigation tracking of the aircraft, to form tracked information. The method also includes adjusting the rate using the tracked information such that the rate about matches the optimal climb rate.

The illustrative embodiments also provide for an aircraft. The aircraft includes a fuselage; a wing connected to the fuselage; an engine connected to one of the wing and the fuselage; and a computer located inside the fuselage and in communication with controls for operating the aircraft. The computer stores program code, which when executed by a processor of the computer, executes a method for automatically using the controls to operate the aircraft. The program code includes program code for computing an optimal climb rate profile representing optimized fuel consumption by the aircraft during a cruise climb to an optimal altitude where fuel consumption is minimized during a cruise. The climb rate profile is represented on a graph of altitude versus ground distance. The climb rate profile represents an optimal climb rate. The program code also includes program code for initiating, after computing, a cruise climb for the aircraft. The program code also includes program code for tracking a three-dimensional position of the aircraft using both vertical navigation tracking of the aircraft and lateral navigation tracking of the aircraft, to form tracked information. The program code also includes program code for adjusting the rate using the tracked information such that the rate about matches the optimal climb rate.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of a sample user interface onboard an aircraft for initiating an optimum cruise climb using navigation in a multi-control display unit, in accordance with an illustrative embodiment;

FIG. 7 is an illustration of a sample user interface of a multi-control display unit onboard an aircraft for displaying an airline policy, in accordance with an illustrative embodiment;

DETAILED DESCRIPTION

Figure 1:
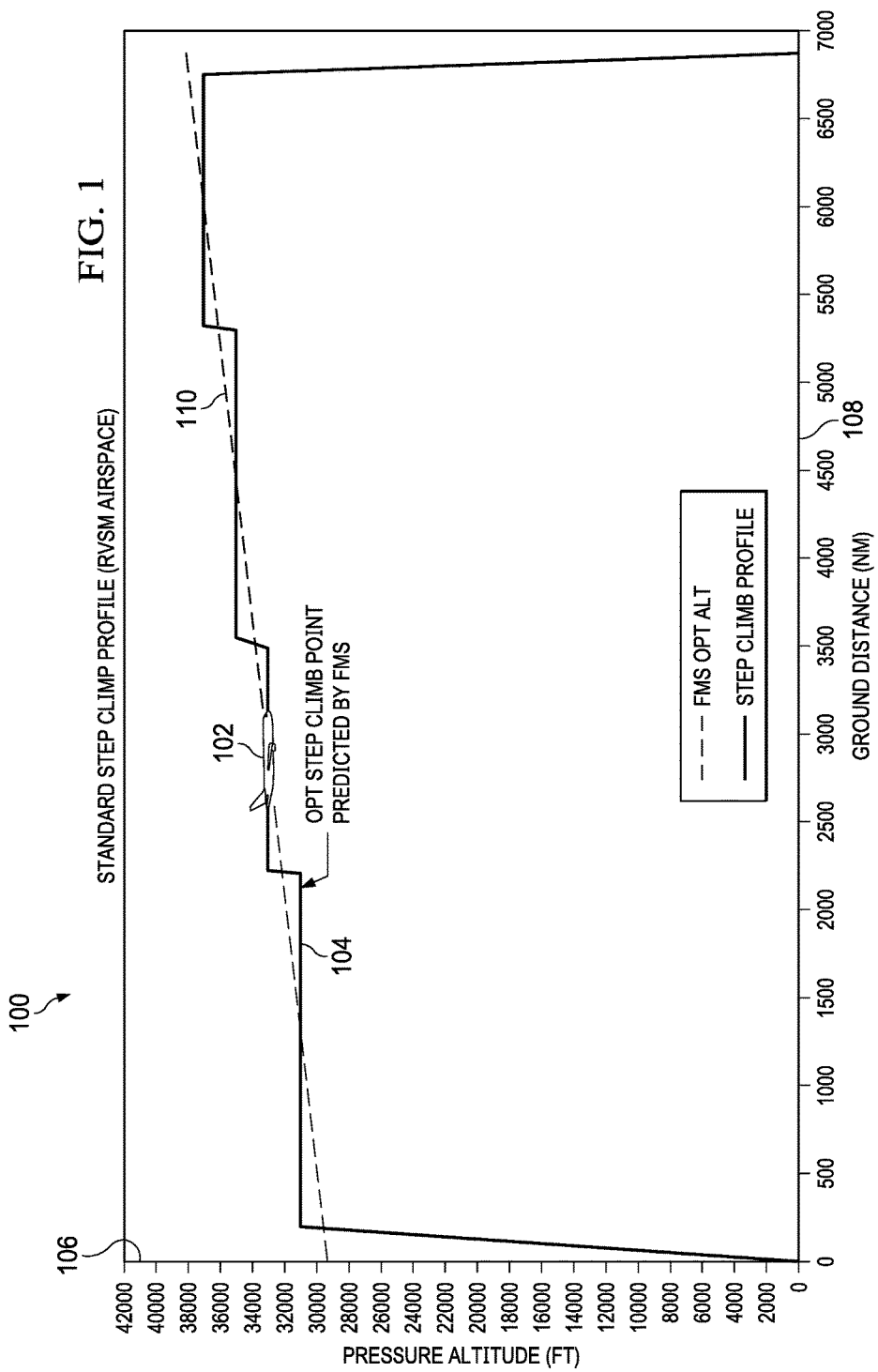
FIG. 1 is an illustration of a graph representing a step climb profile, in accordance with an illustrative embodiment.

The illustrative embodiments are directed to a method to reduce overall fuel consumption during flight. The illustrative embodiments accomplish this goal by tracking the path of optimum flight altitudes as a function of weight loss due to fuel burn, allowing for reduced fuel consumption compared to current step climb techniques on long haul flights.

The illustrative embodiments contemplate a precise flight level change software or hardware-implemented algorithm on VNAV/LNAV (Vertical Navigation/Lateral Navigation) tracking by adding capabilities to an aircraft's FMS (Flight Management System) and AFCS (Automatic Flight Control System). The illustrative embodiments allow for aircraft operations around the optimum vertical and lateral path as a function of aircraft and flight parameters. These flight parameters may include weight, external air temperature, direct wind velocity, Mach number, and possibly other parameters relevant to aircraft flight. The illustrative embodiments may be applied to all types of aircraft.

Calculations and analysis indicate that the illustrative embodiments provide for a potential savings of about 50 kg to about 150 kg of fuel on 2000 foot climbs. In addition, the illustrative embodiments reduce a pilot's workload while using VNAV/LNAV instead of other autopilot vertical/lateral modes.

The illustrative embodiments provide for FMS and AFCS capabilities to automatically perform a precise flight level change. The flight level change intercepts and tracks the vertical and lateral path of the aircraft to the computed optimum altitude. A continuous cruise climb at very low rates, less than about 100 feet per minute, can be expected. Also, a cruise descent at idle thrust setting can be expected.

Thus, the illustrative embodiments address the issue of excessive fuel consumption related to non-optimal flight climb paths. The illustrative embodiments address this issue by providing for FMC and AFCS capabilities to automatically perform a flight level change, which intercept and lock the vertical path to the computed optimum altitude.

Flying at non-optimum altitudes can cause significant fuel penalties, with the effect of fuel burn correlating to weight loss and therefore an increase in the optimum flight altitude. Currently, to address this problem, aircraft engage in what is known as step climbs: a pattern of aircraft operation in which the aircraft is relatively level for a time, followed by a short relatively steep ascent, with this pattern repeated until cruise altitude is reached. See FIG. 1, for example.

Current step climb techniques include changing the cruise levels using steps of 2000 feet to 4000 feet, depending on the type of airspace. Each time the aircraft becomes lighter as it burns fuel. As the aircraft becomes lighter, the aircraft remains close to the optimum altitude.

The ideal scenario would be to follow the optimum altitude via a continuous cruise climb and descent path by air traffic control (ATC), engine performance, or aerodynamics (buffet limits). There are some areas in the world, especially over remote northern Canada and Australian airspaces, where ATC typically authorizes the use of "block altitudes". In such airspaces, initial and final altitude limits are established and the aircraft is free to climb and descend, at any desired rate, at the pilot's discretion.

In such an airspace, upon ACMS (Airplane Condition Monitoring System) data analysis, reduced rates of climb are frequently detected, usually using the minimum limit permitted by the AFCS on vertical speed mode (V/S mode), which is 100 feet per minute. This effect has been observed to happen when the aircraft is operating near to the optimum altitude calculated by the existing FMS, suggesting that pilots are intentionally trying to trim the aircraft's vertical path with respect to the optimum altitude. However, it is noted that such a strategy increases pilot workload, requiring a very precise control of vertical maneuvering, and strict monitoring of the optimum altitude with "mini step climb" points.

Based on these observations, a theoretical research model was developed to evaluate different step climb techniques in order to determine the new optimum rate of climb and intermediate steps in order to result in minimal fuel burn. Many parameters including weight, cost index, wind, and temperature scenarios were evaluated in order to determine what would be an ideal procedure for pilots. These studies have confirmed that if the aircraft had the capability to climb exactly at the rate of the new optimum altitude climbs, such as between about ten to about fifty feet per minute for all aircraft models, the total climb cost would be minimized.

However, this approach would require more than half of the current AFCS rate of climb resolution. In other words, this approach is beyond the technical abilities of available automated flight control systems. Thus, the illustrative embodiments provide for using lateral and vertical navigation tracking in order to precisely measure a climb rate which achieves the optimal fuel usage to achieve an optimal altitude at which the aircraft flies most efficiently.

Figure 2:
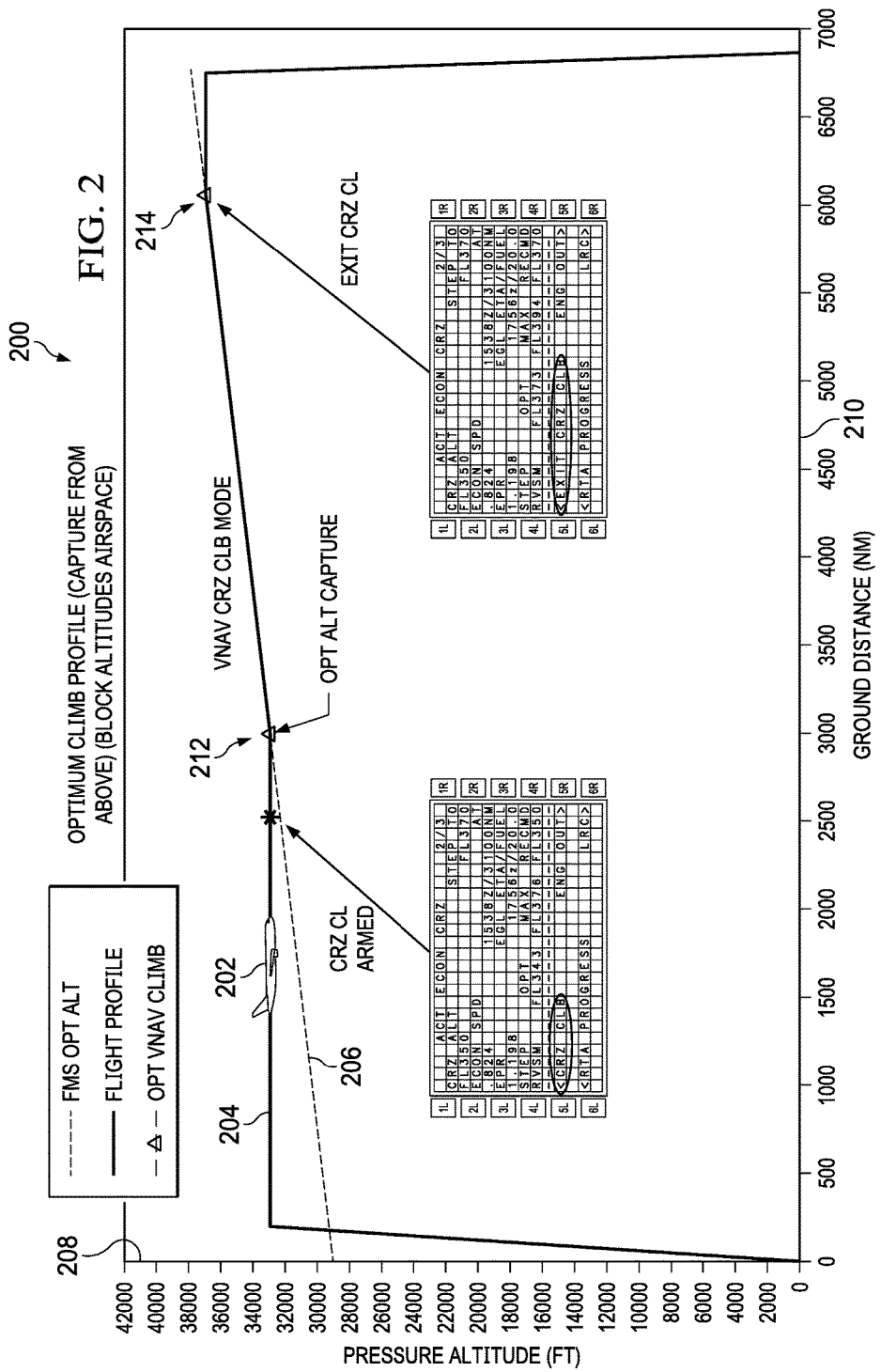
FIG. 2 is an illustration of a graph representing an optimal climb profile initiated when the aircraft begins above the optimal climb profile, in accordance with an illustrative embodiment.
Figure 3:
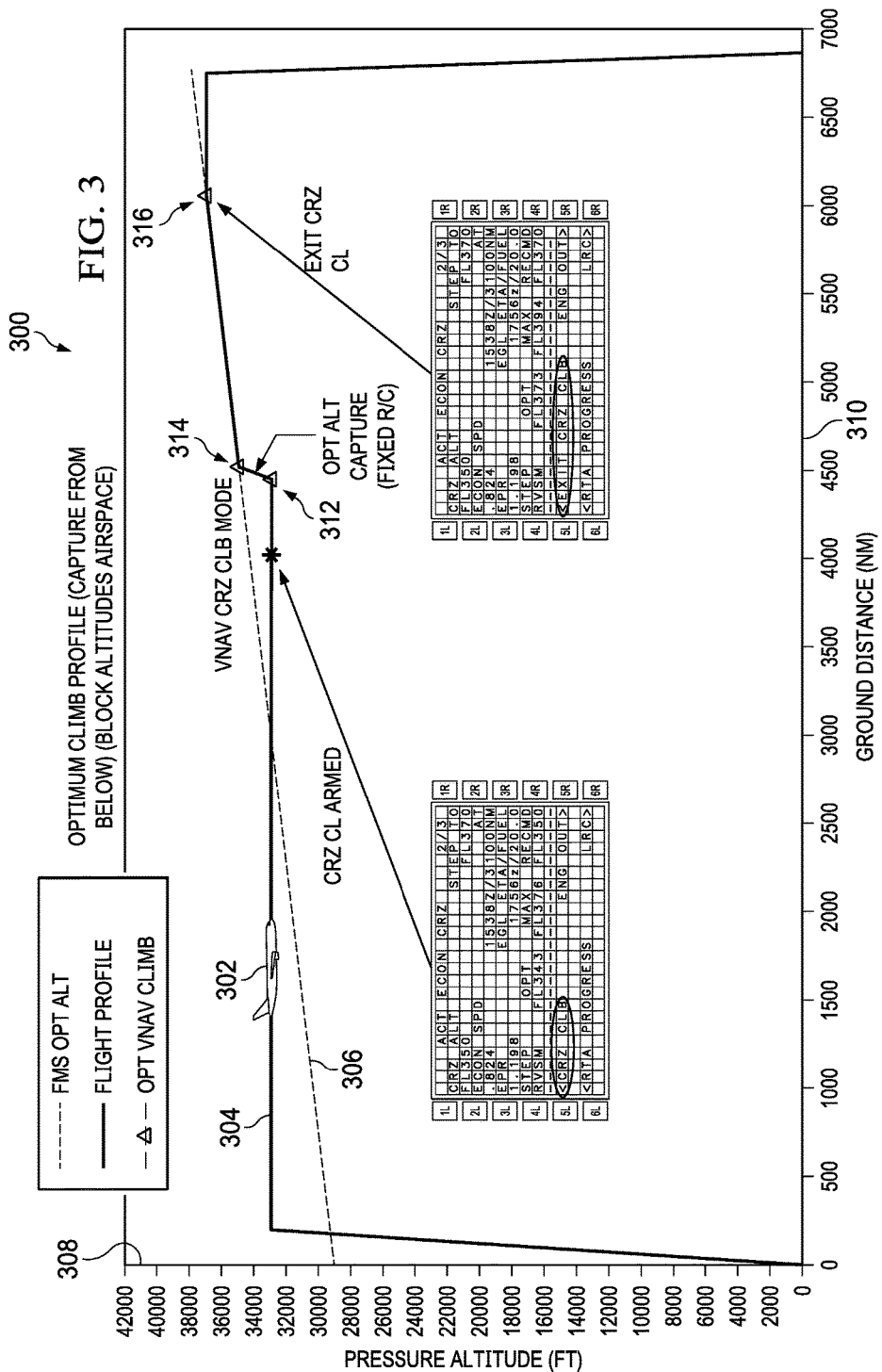
FIG. 3 is an illustration of a graph representing an optimal climb profile initiated when the aircraft begins below the optimal climb profile, in accordance with an illustrative embodiment.

The illustrative embodiments contemplate that if the optimum altitude descents are required, the throttles would be set to idle to minimize fuel usage. On an existing multifunction control display unit (MCDU), the algorithm of the illustrative embodiments could be activated by a prompt "CRZ CL" (cruise climb) on the flight management system cruise climb page (FMS CRZ Page). Once the cruise climb mode is active, a prompt "EXIT CRZ CL" might be available for the pilot in order to exit this feature at any moment. Examples of such a MCDU display are shown in FIGS. 2 through FIG. 3.

In an illustrative embodiment, the CRZ CL and EXIT CRZ CL prompts would be available only between the top of climb and top of descent points. If arming the Optimum VNAV vertical navigation climb mode below the new optimum altitude, an initial fixed vertical speed, preferably not more than 1000 feet per minute, may be adopted until the optimum altitude vertical path is captured.

In an illustrative embodiment, if arming the optimum VNAV CLB mode above the new optimum altitude, the current altitude would be held until the optimum altitude vertical path is captured. The new optimum climb speeds may be a function of COST INDEX. The COST INDEX is the ratio of the time-related cost of an airplane operation and the cost of fuel. The value of the COST INDEX reflects the relative effects of fuel cost on overall trip cost as compared to time-related direct operating costs. In equation form: CI=Time cost ($/hr)/Fuel cost (cents/lb).

Figure 9:
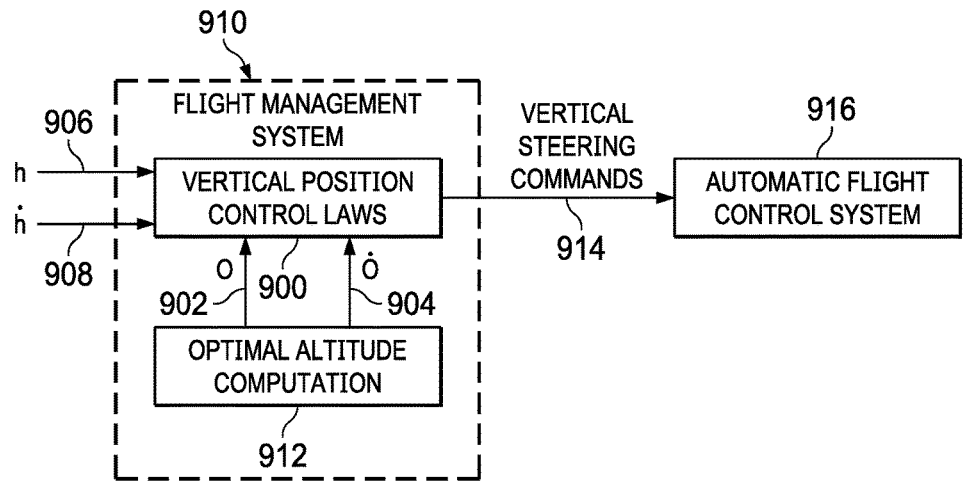
FIG. 9 is an illustration of an example of a vertical navigation control law for an automatic flight guidance system for achieving an optimal cruise climb, in accordance with an illustrative embodiment.

New control display unit (CDU) pages are created to accommodate lateral maneuvering during the three-dimensional optimum VNAV CLB mode. In this situation, a VNAV control law, as shown in FIG. 9, may be utilized to track the lateral path constructed to take advantage of favorable lateral wind and temperature components.

The illustrative embodiments described herein describe a "cruise climb." However, the term "cruise climb" can refer to both a positive climb (gaining altitude) and a negative climb (descending in altitude). The flight management computer (FMC) may compute an optimal profile that contains a cruise descent. This situation can happen when the FMC receives input regarding favorable wind or temperature conditions below the current cruise altitude. In other words, the optimal climb profile may change with updated weather information or other types of information.

When this change to the optimal climb profile happens, the throttles of the aircraft are pulled back to idle such that the fuel burn during the cruise descent can be minimized. In this situation, there is no optimal descent rate the airplane has to follow. The airplane just descends at a rate that corresponds to the throttle idle setting. Once the aircraft reaches the optimal climb profile again for a given altitude at a given distance traveled, the aircraft may then resume using VNAV/LNAV as feedback to the aircraft's automatic control system to operate the aircraft to resume the optimal climb profile. In this manner, an aircraft may follow an optimal "climb" profile that includes both positive climbs (ascent) and negative climbs (descent).

In an illustrative embodiment, a pilot (or even a ground crew before flight) can enter a custom climb profile into the computer. In this case, VNAV/LNAV can be used as feedback to operate the aircraft to precisely follow the custom climb profile.

FIG. 1 is a graph representing a step climb profile, in accordance with an illustrative embodiment. Graph 100 represents a typical climb profile for aircraft 102. Aircraft 102 is a commercial jet, but may be any type of aircraft, as the optimum climb profile tends to be independent of aircraft type.

Graph 100 shows climb profile 104 in terms of altitude of the aircraft as measured by pressure altitude in feet, represented by Y axis 106, versus ground distance traveled by aircraft 102 in nautical miles, represented by X axis 108. Thus, climb profile 104 represents how steeply an aircraft climbs to a given altitude. Climb profile 110 is an optimum climb profile, meaning that if an aircraft can climb at the rate represented by climb profile 110, the aircraft will use the minimum amount of fuel to reach a given altitude, assuming other fuel consumption factors being equal. The target altitude is the altitude at which fuel consumption is minimized, also known as the optimum altitude. The optimum altitude may change over time with both atmospheric conditions and by the fact that the weight of aircraft 102 lessens over time as it uses fuel. Thus, climb profile 110 may vary with time (not shown in graph 100).

Currently, the flight management system of an aircraft (in other words its autopilot) is incapable of precisely matching the precise rate of climb of climb profile 110. Climb profile 110 can usually be expressed as a climb rate of one hundred feet per minute or less, typically between about ten feet per minute and fifty feet per minute, depending on atmospheric conditions, altitude, aircraft weight, and other factors. However, the flight management system of aircraft 102 typically can only manage climb rates of about one thousand feet per minute or more. Thus, typically aircraft follow a step climb profile, represented by climb profile 104, with each "step" representing a relatively quick ascent by aircraft 102 to a point above climb profile 110. At that point, aircraft 102 remains steady until some point below climb profile 110 and then takes another step up. This pattern is repeated until aircraft 102 reaches its optimum cruise altitude.

Unfortunately, climb profile 104 is not as fuel efficient as climb profile 110. A human pilot, in some cases only, might be able to guide aircraft 102 along climb profile 110. However, doing so requires constant vigilance and may not be possible in some cases due to changing conditions. Thus, techniques for automatically guiding aircraft 102 along climb profile 110 would be advantageous.

FIG. 2 is a graph representing an optimal climb profile initiated when the aircraft begins above the optimal climb profile, in accordance with an illustrative embodiment. Graph 200 represents aircraft 202 following climb profile 204, which initially is above climb profile 206. Climb profile 206 is the optimum climb profile. Aircraft 202 is a commercial jet, but may be any type of aircraft, as the optimum climb profile tends to be independent of aircraft type.

Graph 200 shows climb profile 204 in terms of altitude of aircraft 202 as measured by pressure altitude in feet, represented by Y axis 208, versus ground distance traveled by aircraft 202 in nautical miles, represented by X axis 210. Thus, climb profile 204 represents how steeply an aircraft climbs to a given altitude. Climb profile 206 is an optimum climb profile, meaning that if an aircraft can climb at the rate represented by climb profile 206, the aircraft will use the minimum amount of fuel to reach a given altitude, assuming other fuel consumption factors being equal. The target altitude is the altitude at which fuel consumption is minimized, also known as the optimum altitude. The optimum altitude may change over time with both atmospheric conditions and by the fact that the weight of aircraft 202 lessens over time as it uses fuel. Thus, climb profile 206 may vary of time (not shown in graph 200).

Climb profile 204 assumes that aircraft 202 has initially ascended to a given altitude for reasons other than maximizing fuel efficiency. After aircraft 202 reaches this given altitude, it cruises at a level cruise until it reaches capture point 212, which represents the point at which aircraft 202 captures climb profile 206. Aircraft 202 follows climb profile 206 until exit point 214, which represents the point at which aircraft 202 exits climb profile 206. Aircraft 202 could exit climb profile 206 for any of a number of reasons, such as beginning descent for landing, changing altitude because ordered to do so by air traffic control, avoiding weather conditions, or any number of reasons.

It has been discovered that while the flight management system (FMS) of aircraft 202 is incapable of precisely following climb profile 206, it is possible to use other techniques to precisely measure and control the rate of climb of aircraft 202. In particular, it has been discovered that vertical position and horizontal position tracking of the aircraft can be used as feedback input to control aircraft systems (engine power, wing position, etc.) to climb at a precise rate. Using vertical and horizontal tracking as the feedback input is sufficiently sensitive such that aircraft 202 is capable of matching climb profile 206, which may be less than one hundred feet per minute.

FIG. 3 is a graph representing an optimal climb profile initiated when the aircraft begins below the optimal climb profile, in accordance with an illustrative embodiment. Graph 300 represents aircraft 302 following climb profile 304, wherein aircraft 302 is below climb profile 306 when the optimal climb profile is initiated (at the CRZ CL ARMED point). Climb profile 306 is the optimum climb profile. Aircraft 302 is a commercial jet, but may be any type of aircraft, as the optimum climb profile tends to be independent of aircraft type.

Graph 300 shows climb profile 304 in terms of altitude of aircraft 302 as measured by pressure altitude in feet, represented by Y axis 308, versus ground distance traveled by aircraft 302 in nautical miles, represented by X axis 310. Thus, climb profile 304 represents how steeply an aircraft climbs to a given altitude. Climb profile 306 is an optimum climb profile, meaning that if an aircraft can climb at the rate represented by climb profile 306, the aircraft will use the minimum amount of fuel to reach a given altitude, assuming other fuel consumption factors being equal. The target altitude is the altitude at which fuel consumption is minimized, also known as the optimum altitude. The optimum altitude may change over time with both atmospheric conditions and by the fact that the weight of aircraft 302 lessens over time as it uses fuel. Thus, climb profile 306 may vary of time (not shown in graph 300).

Graph 300 assumes that aircraft 302 has been flying at a fixed altitude, for whatever reason, until aircraft 302 is now at an altitude that is below climb profile 306. Thus, aircraft 302 must ascend to the altitude which matches climb profile 306. To maximize fuel efficiency, aircraft 302 should ascend at a climb rate of less than about one thousand feet per minute, beginning at initiation point 312. Once aircraft 302 reaches climb profile 306, aircraft 302 slows its climb rate until it matches climb profile 306, beginning at point 314. Again, aircraft 302 uses vertical and lateral tracking of aircraft 302 as feedback into the flight management system to control the climb rate of aircraft 302 with sufficient sensitivity to match climb profile 306. Aircraft 302 continues to match climb profile 306 until exit point 316, at which point the aircraft exits matching the climb profile for whatever reason.

For both FIG. 2 and FIG. 3, it has been calculated and shown that a savings of fifty kilograms to one hundred and fifty kilograms of fuel can be achieved on long haul flights by using lateral and vertical navigation tracking to achieve an optimum climb profile. This fuel savings is per aircraft per flight. This fuel savings is relative to the step climb profile shown in FIG. 1, which was previously used. Thus, using vertical and lateral tracking of the aircraft as feedback into the flight management system of an aircraft to control aircraft operation represents a considerable savings of fuel. The cost of jet fuel varies widely, but it is roughly about one dollar per kilogram. A major air carrier may operate hundreds of aircraft, perhaps up to one thousand aircraft in a fleet, with each aircraft making multiple trips per day. Thus, while the cost savings for a single trip by a single aircraft may be small, in the aggregate it is possible for millions of dollars to be saved per year by a major air carrier as a result of the innovation represented by the illustrative embodiments.

Figure 4:
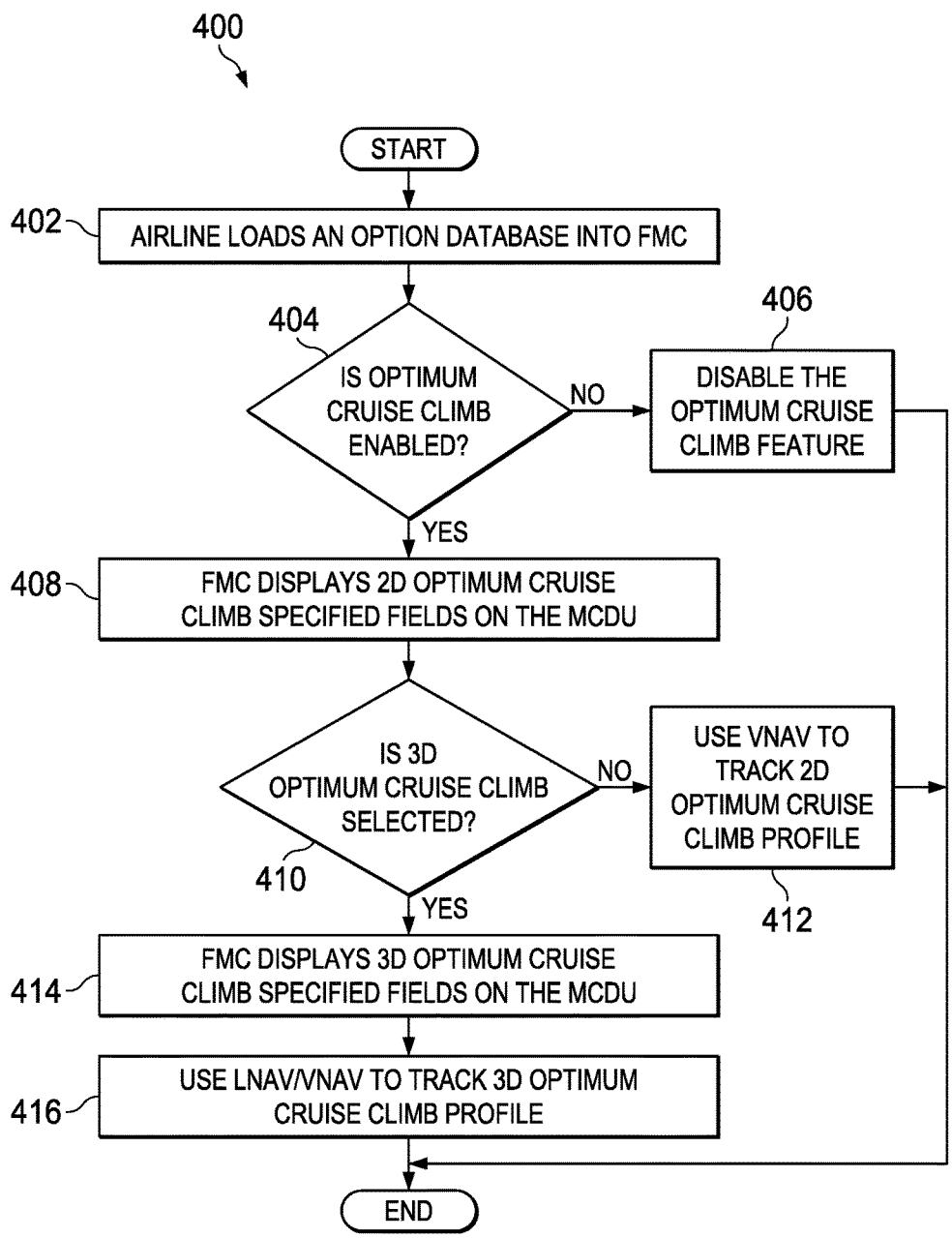
FIG. 4 is an illustration of a flowchart of a method of using navigation to achieve an optimum cruise climb, in accordance with an illustrative embodiment.

FIG. 4 is a flowchart of a method of using navigation to achieve an optimum cruise climb, in accordance with an illustrative embodiment. Method 400 specifically is a method for using vertical and horizontal navigational tracking as feedback into a flight management system to operate an aircraft to achieve an optimal climb profile. Method 400 may be implemented using an onboard computer, which may be represented by data processing system 1400 of FIG. 14.

Method 400 may begin when an airline loads an option database into a FMC (operation 402). The airline is an air carrier. The FMC is a flight management control system. The option database is a database containing the information that the FMC needs to operate an aircraft to precisely follow a climb profile, as described for example in FIG. 2 or FIG. 3.

Next, a determination is made whether an optimal cruise climb is enabled (operation 404). If no, then the optimum cruise climb feature is disabled (operation 406) and the method terminates. If yes, then the FMC displays a 2D optimum cruise climb specific fields on the MCDU (operation 408). Again, "FMC" is a flight management control system. Again, "MCDU" is a multifunction control display unit. "2D" stands for "two dimensional".

Then, a determination is made whether a 3D optimum cruise climb is selected (operation 410). "3D" stands for "three dimensional". If no, then the computer will use VNAV to track a 2D optimum cruise climb profile for the aircraft (operation 412). "VNAV" stands for vertical navigation tracking. At this point, the process terminates, or at least is maintained until exiting the optimum climb profile.

Returning to operation 410, if a 3D optimum cruise climb is selected, then the FMC displays 3D optimum cruise climb specific fields on the MCDU (operation 414). The processor then uses both LNAV and VNAV to track a 3D optimum cruise climb profile (operation 416). "LNAV" stands for lateral navigation tracking. The method may terminate thereafter.

For reference, FIG. 1 through FIG. 3 each represents a 2D climb profile, with FIG. 2 and FIG. 3 showing an aircraft using VNAV to achieve the optimal climb profile. A 3D profile would add a third axis to FIG. 2 or FIG. 3 (into or out of the page), with the third axis representing nautical miles traveled in an axis perpendicular to the axis shown in FIG. 2 or FIG. 3.

FIG. 5 through FIG. 8 represent interfaces on a multifunction control display unit (MCDU) of an aircraft. FIG. 5 through FIG. 8 should be read together as being part of a singular display system.

Figure 5:
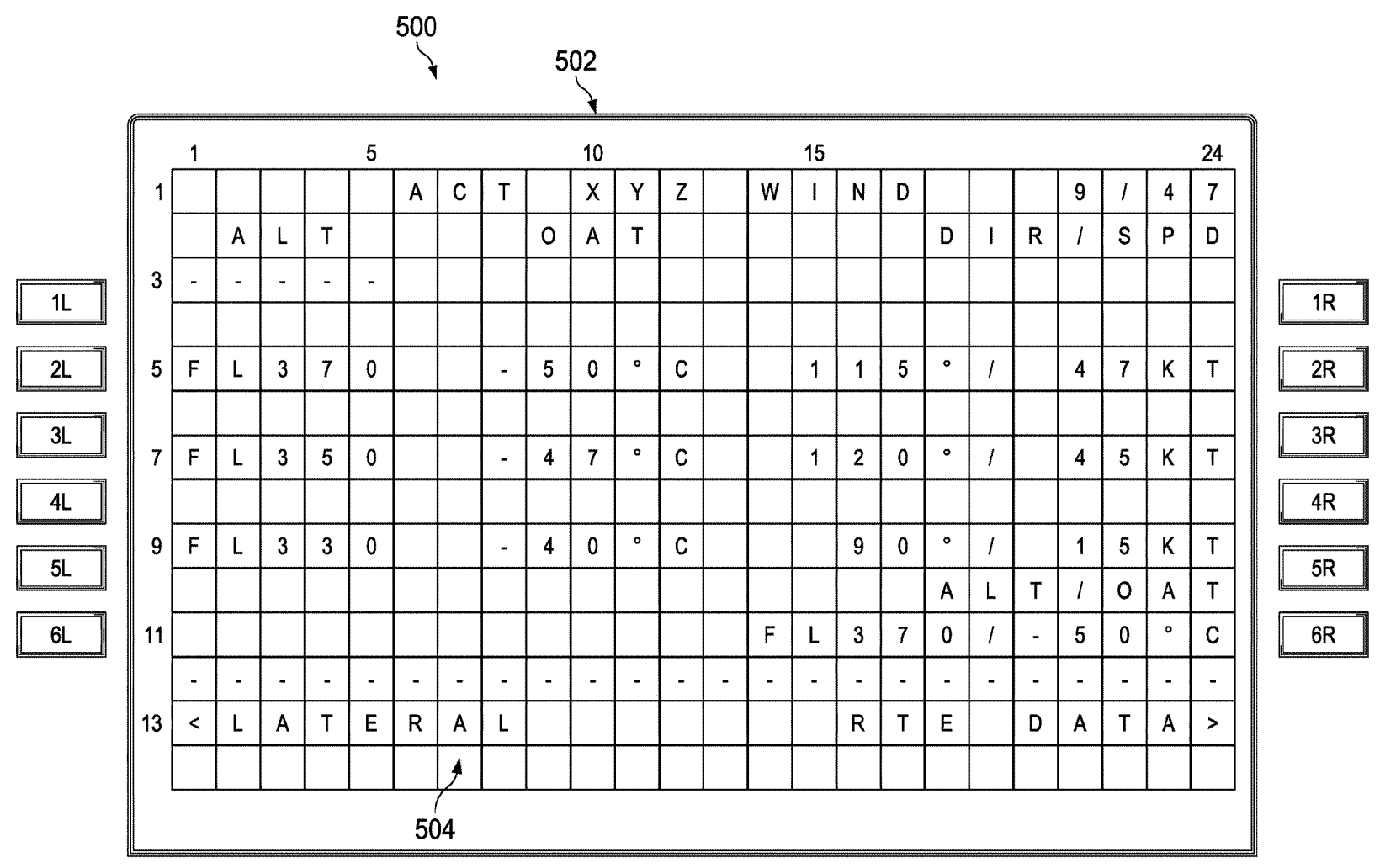

FIG. 5 is a sample user interface onboard an aircraft for initiating an optimum cruise climb using navigation in a multi-control display unit, in accordance with an illustrative embodiment. Interface 500 may be a display of a multifunction control display unit (MCDU) of a computer onboard an aircraft. Interface 500 is an example of an interface useable by a pilot with respect to implementing an optimum cruise climb, as explained with respect to FIG. 2 through FIG. 4.

In particular, interface 500 shows the wind MCDU page associated with waypoint XYZ, as indicated by arrow 502. When the 3D optimum cruise climb is enabled, field 6L lateral is displayed, indicated by arrow 504. When this field is pressed or otherwise actuated, the lateral wind MCDU page is accessed, as shown in FIG. 6.

Figure 6:
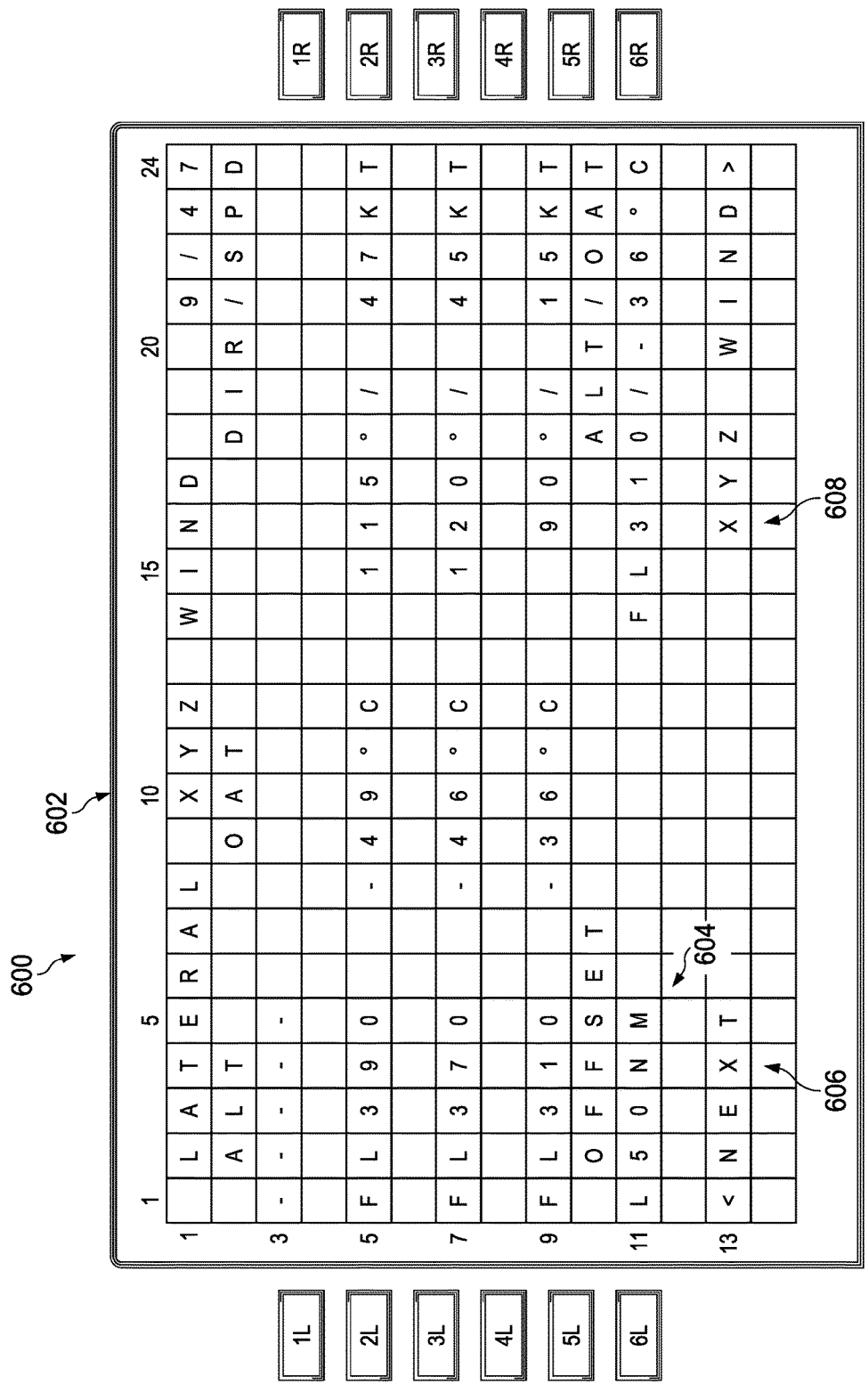
FIG. 6 is an illustration of a sample user interface onboard an aircraft for displaying a lateral wind and temperature in a multi-control display unit, in accordance with an illustrative embodiment.

FIG. 6 is a sample user interface onboard an aircraft for displaying a lateral wind and temperature in a multi-control display unit, in accordance with an illustrative embodiment. Interface 600 may be a display of a multifunction control display unit (MCDU) of a computer onboard an aircraft. Interface 600 is an example of an interface useable by a pilot with respect to implementing an optimum cruise climb, as explained with respect to FIG. 2 through FIG. 4. FIG. 6 is a continuation of FIG. 5.

In particular, FIG. 6 shows a new lateral wind MCDU page associated with waypoint XYZ, as shown by arrow 602, when the 3D optimum cruise climb is selected. In the 5L offset field, as shown at arrow 604, the location of the lateral wind and temperature is entered as an offset direction (left or right) and offset distance. Other XYZ lateral wind pages can be accessed using the 6L Next field, as shown at arrow 606. The pilot can return the XYZ wind MCDU page using the 6R field, as shown by arrow 608.

Figure 7:
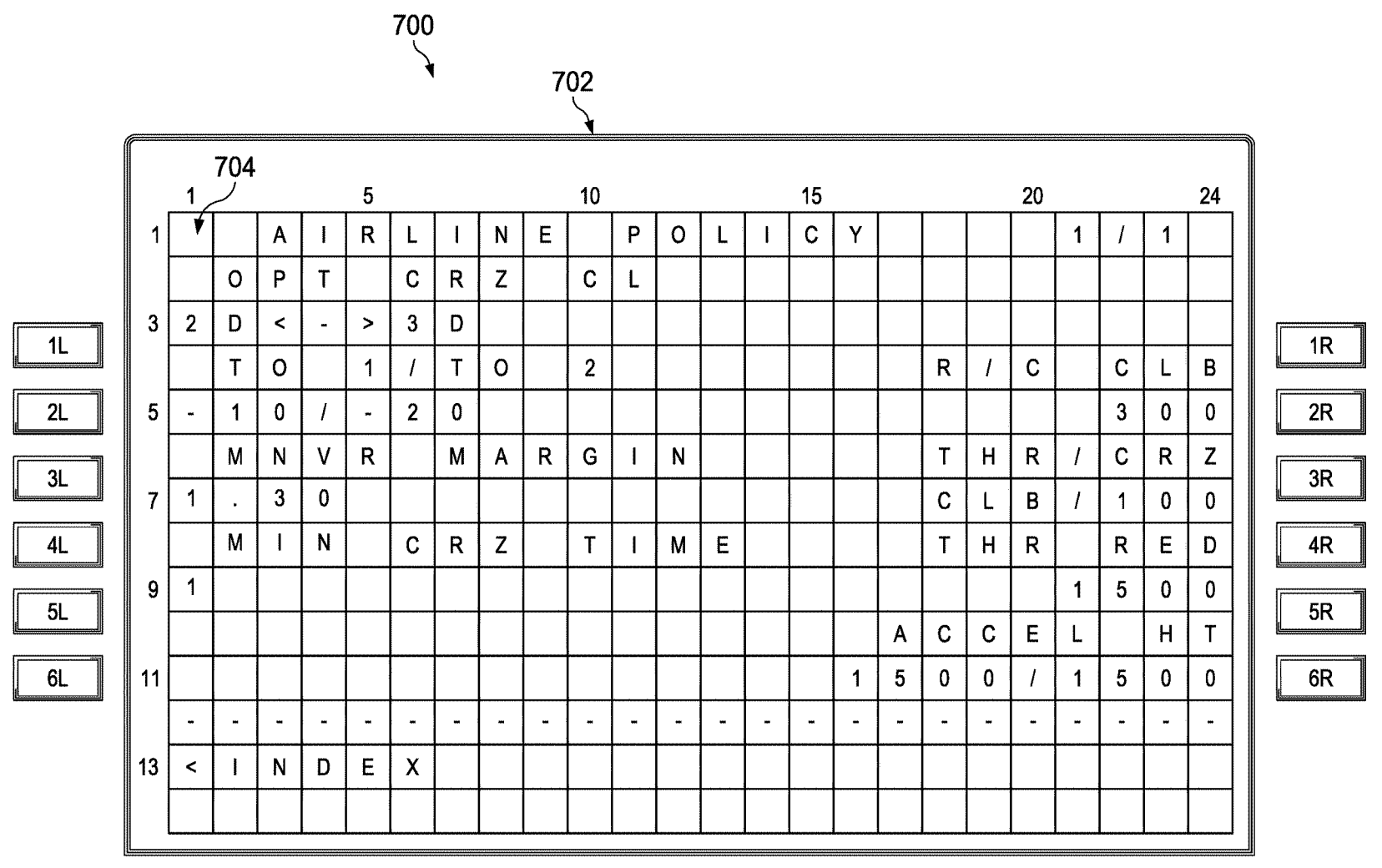

FIG. 7 is a sample user interface of a multi-control display unit onboard an aircraft for displaying an airline policy, in accordance with an illustrative embodiment. Interface 700 may be a display of a multifunction control display unit (MCDU) of a computer onboard an aircraft. Interface 700 is an example of an interface useable by a pilot with respect to implementing an optimum cruise climb, as explained with respect to FIG. 2 through FIG. 4. FIG. 7 is a continuation of FIG. 6 and FIG. 5.

In particular, FIG. 7 shows the airline policy MCDU page, as indicated by arrow 702, where the maintenance crew can select 2D or 3D for the optimum cruise climb feature in the 1L OPT CRZ CL field, as indicated by arrow 704. The choice between 2D and 3D can be toggled by selecting the 1L OPT CRZ CL field.

Figure 8:
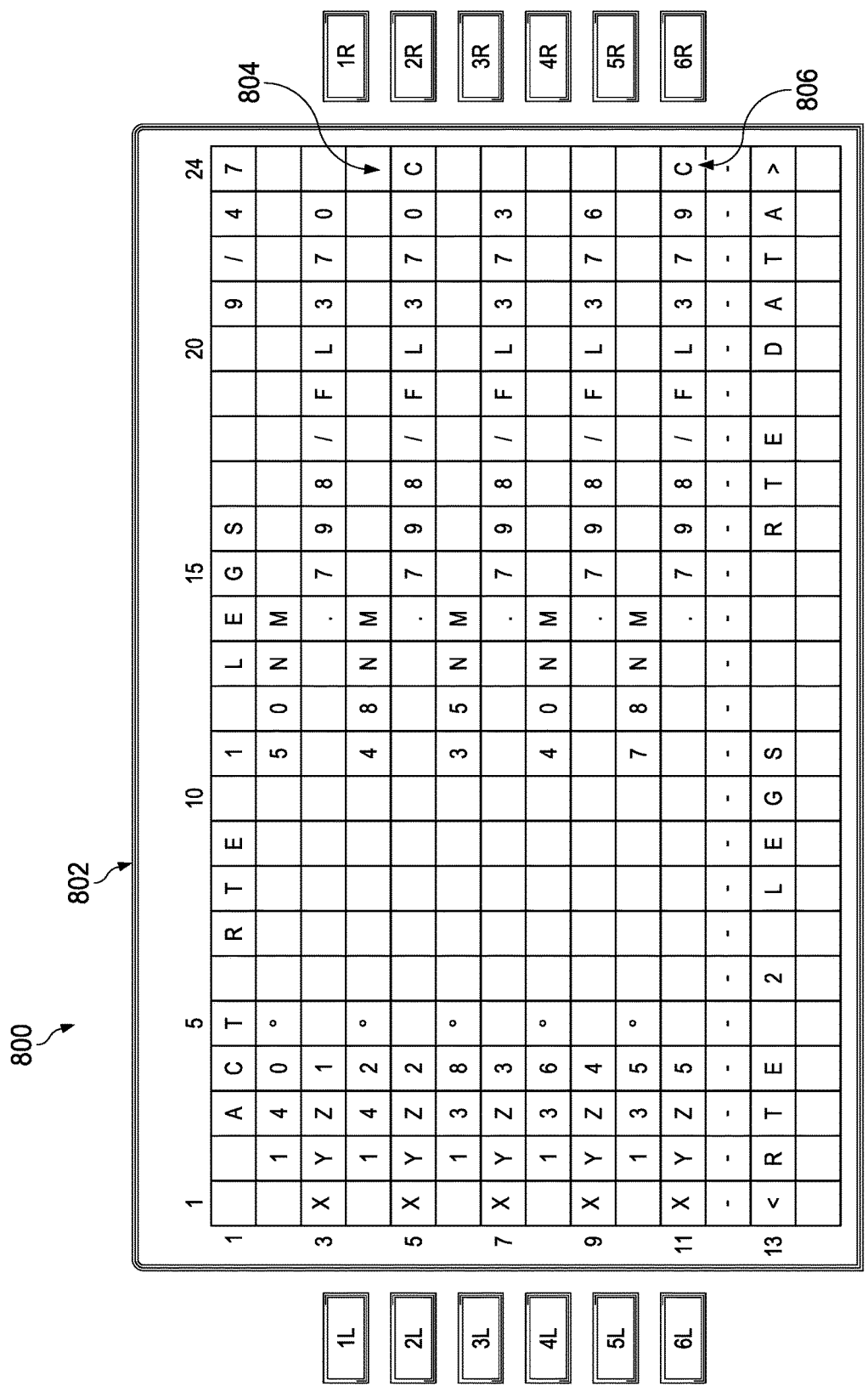
FIG. 8 is an illustration of a sample user interface onboard an aircraft for displaying predicted speed and altitude for each waypoint in a multi-control display unit, in accordance with an illustrative embodiment.

FIG. 8 is a sample user interface onboard an aircraft for displaying predicted speed and altitude for each waypoint in a multi-control display unit, in accordance with an illustrative embodiment. Interface 800 may be a display of a multifunction control display unit (MCDU) of a computer onboard an aircraft. Interface 800 is an example of an interface useable by a pilot with respect to implementing an optimum cruise climb, as explained with respect to FIG. 2 through FIG. 4. FIG. 8 is a continuation of FIG. 7 through FIG. 5.

In particular, FIG. 8 shows LEGS page, as shown by arrow 802, where the speed and altitude prediction at each waypoint are displayed. "LEGS" is FMC page that depicts multiple waypoint sequence and their associated speed and altitude. The flight crew can specify the start point, as indicated by arrow 804, and the end point, as indicated by arrow 806, for the optimum cruise climb. During this block, the VNAV/LNAV may be used to track the optimum vertical and/or lateral path of the aircraft. This path is then used as feedback to the flight control system to operate the aircraft with sufficient sensitivity to precisely follow the optimum cruise climb profile, such as that shown in FIG. 2 or FIG. 3.

FIG. 9 is an example of a vertical navigation control law for an automatic flight guidance system for achieving an optimal cruise climb, in accordance with an illustrative embodiment. FIG. 9 shows the use of the Flight Management Systems' Vertical Position Control, commonly known as VNAV, to track the optimum altitude utilizing the optimum altitude rate of change, to track the optimum altitude as a path in space. The airplane control is contained in the aircraft's Automatic Flight Guidance System. Thus, FIG. 9 describes techniques for using VNAV to track a path in space defined by the current optimum altitude.

Vertical position control laws 900 is an example of a VNAV control law for the optimum cruise climb feature. Value O 902 is the commanded optimum altitude computed by flight management system. Value Ȯ 904 is the commanded optimum altitude rate of climb computed by flight management system. Value 'h' 906 is the aircraft altitude. Value ḣ 908 is the aircraft altitude rate of change. These values are fed into flight management system 910 and are processed by optimal altitude computations 912 according to vertical position control laws 900, which are understood in the art. The result of this processing is vertical steering commands 914 sent to automatic flight control system 916, which in turn implements the desired optimal cruise climb.

Figure 10:
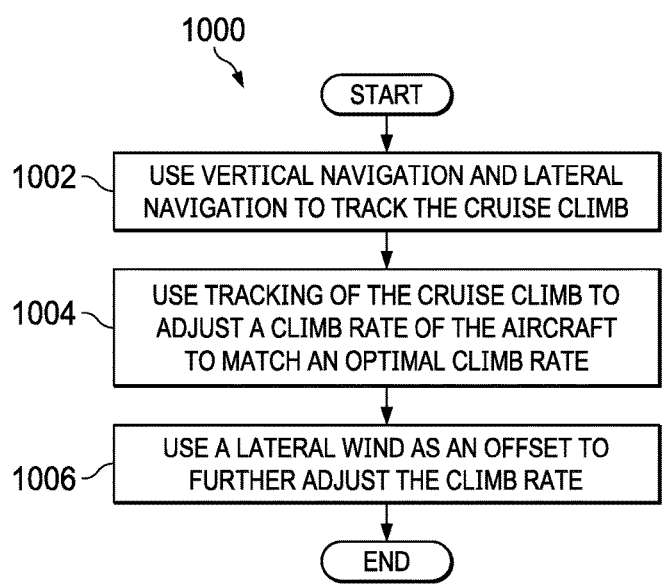
FIG. 10 is an illustration of a flowchart of a method of optimizing a cruise climb of an aircraft, in accordance with an illustrative embodiment.

FIG. 10 is a flowchart of a method of optimizing a cruise climb of an aircraft, in accordance with an illustrative embodiment. Method 1000 is a variation of method 400 of FIG. 4 and is a method of implementing the optimum cruise climb described with respect to FIG. 2 and FIG. 3. Method 1000 may be implemented by an onboard computer, such as for example, data processing system 1400 of FIG. 14.

Method 1000 may be characterized as a method of optimizing a cruise climb of an aircraft. Method 1000 includes using vertical navigation and lateral navigation to track the cruise climb (operation 1002). Method 1000 also includes using tracking of the cruise climb to adjust a climb rate of the aircraft to match an optimal climb rate (operation 1004). Optionally, method 1000 may terminate at this point.

However, method 1000 may be varied. For example, in an illustrative embodiment, the climb rate is less than one hundred feet per minute. In another illustrative embodiment, method 1000 may also include using a lateral wind and temperature as an offset to further adjust the climb rate (operation 1006). The method may terminate thereafter.

Method 1000 may be further varied and may have more or fewer steps. Thus, the illustrative embodiments described with respect to FIG. 10 do not necessarily limit the claimed inventions.

Figure 11:
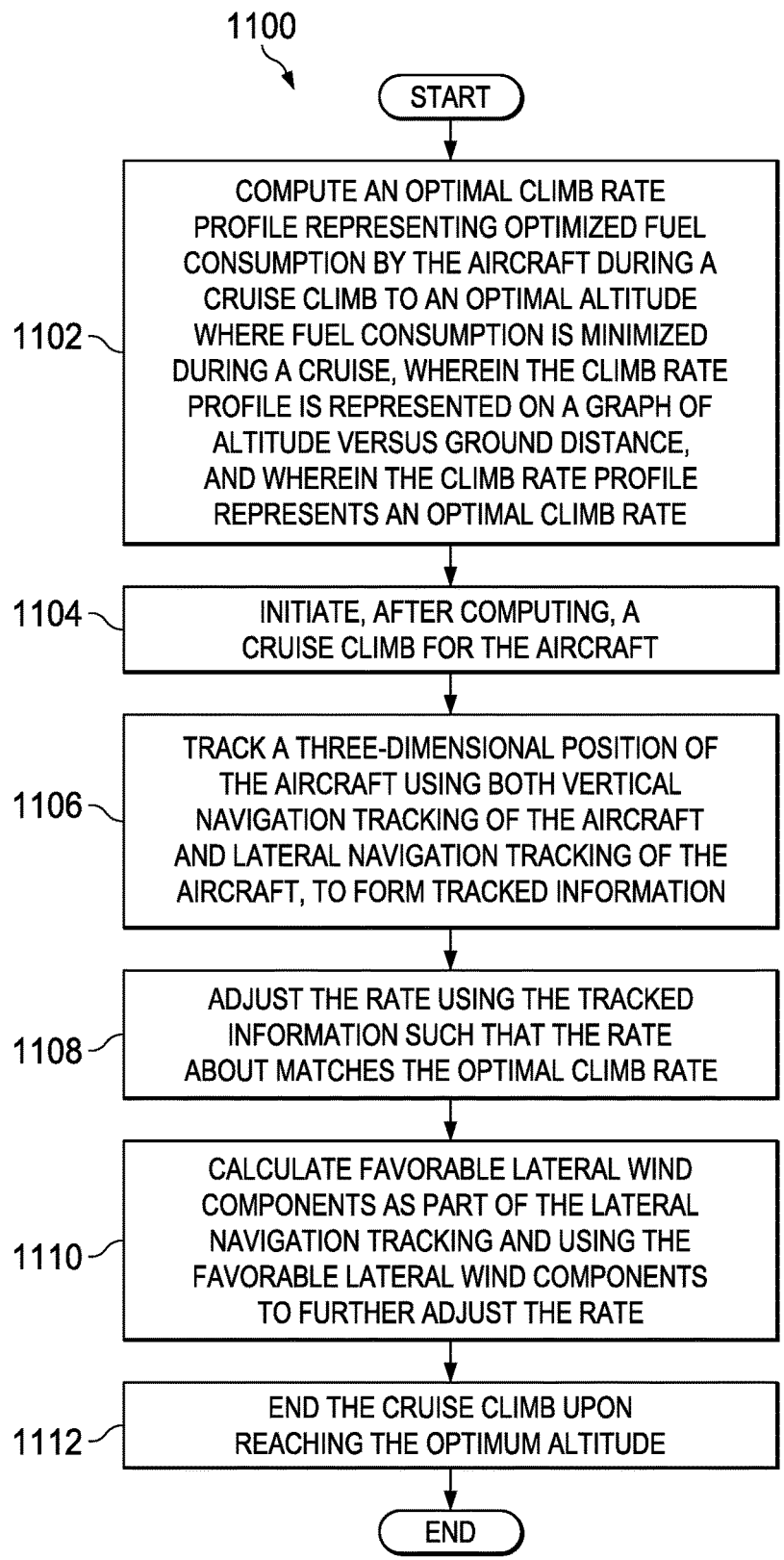
FIG. 11 is an illustration of a flowchart of another method of optimizing a cruise climb of an aircraft, in accordance with an illustrative embodiment.

FIG. 11 is a flowchart of another method of optimizing a cruise climb of an aircraft, in accordance with an illustrative embodiment. Method 1100 is a variation of method 400 of FIG. 4 or method 1000 of FIG. 10. Method 1100 is a method of implementing the optimum cruise climb described with respect to FIG. 2 and FIG. 3. Method 1100 may be implemented by an onboard computer, such as for example, data processing system 1400 of FIG. 14.

Method 1100 may be characterized as a method of operating an aircraft. Method 1100 includes computing an optimal climb rate profile representing optimized fuel consumption by the aircraft during a cruise climb to an optimal altitude where fuel consumption is minimized during a cruise, wherein the climb rate profile is represented on a graph of altitude versus ground distance, and wherein the climb rate profile represents an optimal climb rate (operation 1102). Next, method 1100 includes initiating, after computing, a cruise climb for the aircraft (operation 1104).

Method 1100 also includes tracking a three-dimensional position of the aircraft using both vertical navigation tracking of the aircraft and lateral navigation tracking of the aircraft, to form tracked information (operation 1106). Method 1100 also includes adjusting the rate using the tracked information such that the rate about matches the optimal climb rate (operation 1108). The method may terminate thereafter.

However, method 1100 may be varied. For example, method 1100 may also include calculating favorable lateral wind and temperature components as part of the lateral navigation tracking and using the favorable lateral wind and temperature components to further adjust the rate (operation 1110).

In an illustrative embodiment, the rate is between about ten feet per minute and about fifty feet per minute. In another illustrative embodiment, adjusting comprises calculating a flight level change that intercepts and then locks a vertical path of the aircraft to the optimum climb rate profile.

Method 1100 may be further varied. For example, assume that before initiating, the aircraft is at an altitude that is above a corresponding altitude for a given ground distance on the climb rate profile at which the aircraft is located. In this case, method 1100 may further include maintaining, before initiating, the altitude until the aircraft reaches a second ground distance on the climb rate profile that matches the altitude of the aircraft; and thereafter initiating the cruise climb.

In another example, assume that before initiating, the aircraft is at an altitude that is below a corresponding altitude for a given ground distance on the climb rate profile at which the aircraft is located. In this case, method 1100 may further include climbing, before initiating, at a rate greater than one hundred feet per minute but less than one thousand feet per minute, until the aircraft reaches a second altitude that corresponds to a second ground distance of the aircraft that is on the climb rate profile; and thereafter initiating the cruise climb.

In another illustrative embodiment, method 1100 may also include ending the cruise climb upon reaching the optimum altitude (operation 1112). The method may terminate thereafter.

Nevertheless, method 1100 may be additionally varied. In an illustrative embodiment, method 1100 may also include automatically selecting a start point and an end point of the cruise climb. In an illustrative embodiment, the cruise climb comprises a negative vertical speed used to track the optimum altitude. In other words, the cruise climb could be a descent, as opposed to an ascent. In still another illustrative embodiment, the rate is further maintained at or below one hundred feet per minute.

Method 1100 may be yet further varied and may have more or fewer steps. Thus, the illustrative embodiments described with respect to FIG. 11 do not necessarily limit the claimed inventions.

Figure 12:
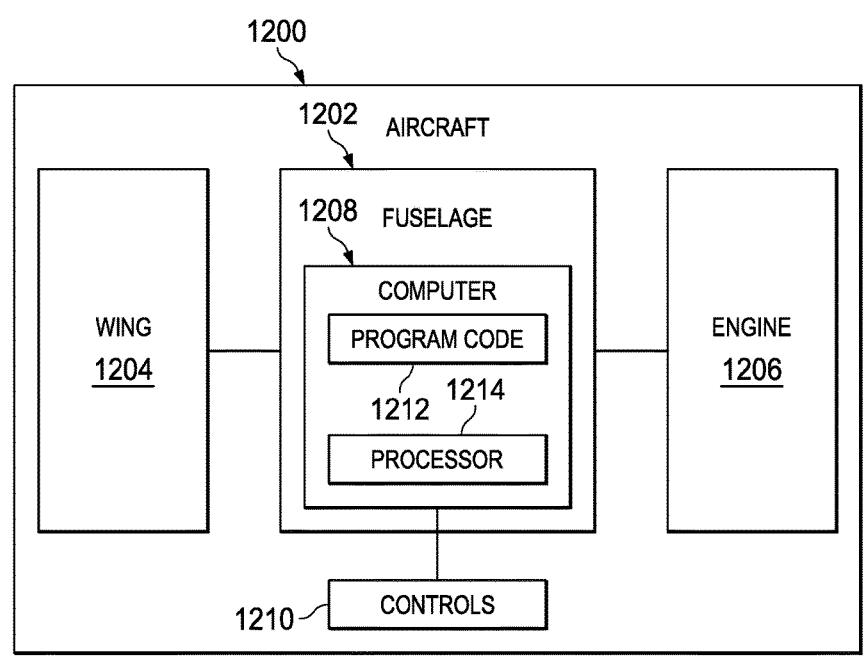
FIG. 12 is an illustration of a block diagram representing an aircraft, in accordance with an illustrative embodiment.

FIG. 12 is a block diagram representing an aircraft, in accordance with an illustrative embodiment. Aircraft 1200 may be a variation of aircraft 1300 of FIG. 13. Aircraft 1200 may be any of the aircraft described with respect to FIG. 2 through FIG. 11.

Aircraft 1200 includes fuselage 1202, wing 1204 connected to fuselage 1202, and engine 1206 connected to one of wing 1204 and fuselage 1202. Aircraft 1200 also includes computer 1208 located inside fuselage 1202 and in communication with controls 1210 for operating aircraft 1200. Computer 1208 stores program code 1212, which when executed by processor 1214 of computer 1208, executes a method for automatically using controls 1210 to operate aircraft 1200. This method can be used to achieve an optimal cruise climb profile in a manner described with respect to FIG. 2 through FIG. 9.

Program code 1212 includes program code for computing an optimal climb rate profile representing optimized fuel consumption by the aircraft during a cruise climb to an optimal altitude where fuel consumption is minimized during a cruise, wherein the climb rate profile is represented on a graph of altitude versus ground distance, and wherein the climb rate profile represents an optimal climb rate. Program code 1212 includes program code for initiating, after computing, a cruise climb for the aircraft.

Program code 1212 includes program code for tracking a three-dimensional position of the aircraft using both vertical navigation tracking of the aircraft and lateral navigation tracking of the aircraft, to form tracked information. Program code 1212 includes program code for adjusting the rate using the tracked information such that the rate about matches the optimal climb rate. The rate may be maintained at or below one hundred feet per minute.

Aircraft 1200 may be further varied. For example, program code 1212 may further include program code for calculating favorable lateral wind and temperature components as part of the lateral navigation tracking and using the favorable lateral wind and temperature components to further adjust the rate.

In an illustrative embodiment, the rate is between about ten feet per minute and about fifty feet per minute. This rate is more sensitive than ordinary FMS controls can handle.

In an illustrative embodiment, the program code for adjusting comprises program code for calculating a flight level change that intercepts and then locks a vertical path of the aircraft to the optimum climb rate profile. A lateral path of the aircraft can also be locked to achieve a 3D optimum climb rate profile.

In an illustrative embodiment, before initiating, the aircraft is at an altitude that is above a corresponding altitude for a given ground distance on the climb rate profile at which the aircraft is located. In this case, program code 1212 may further include program code for maintaining, before initiating, the altitude until the aircraft reaches a second ground distance on the climb rate profile that matches the altitude of the aircraft; and program code for thereafter initiating the cruise climb.

In another illustrative embodiment, before initiating, the aircraft is at an altitude that is below a corresponding altitude for a given ground distance on the climb rate profile at which the aircraft is located. In this case, program code 1212 may further include program code for climbing, before initiating, at a rate greater than one hundred feet per minute but less than one thousand feet per minute, until the aircraft reaches a second altitude that corresponds to a second ground distance of the aircraft that is on the climb rate profile; and program code for, thereafter, initiating the cruise climb.

In still another illustrative embodiment, program code 1212 is configured such that the rate is further maintained at or below one hundred feet per minute. This rate is more sensitive than previous flight control systems could handle.

The illustrative embodiments described with respect to FIG. 12 may be varied still further. Thus, the illustrative embodiments described with respect to FIG. 12 do not necessarily limit the claimed inventions.

Figure 13:
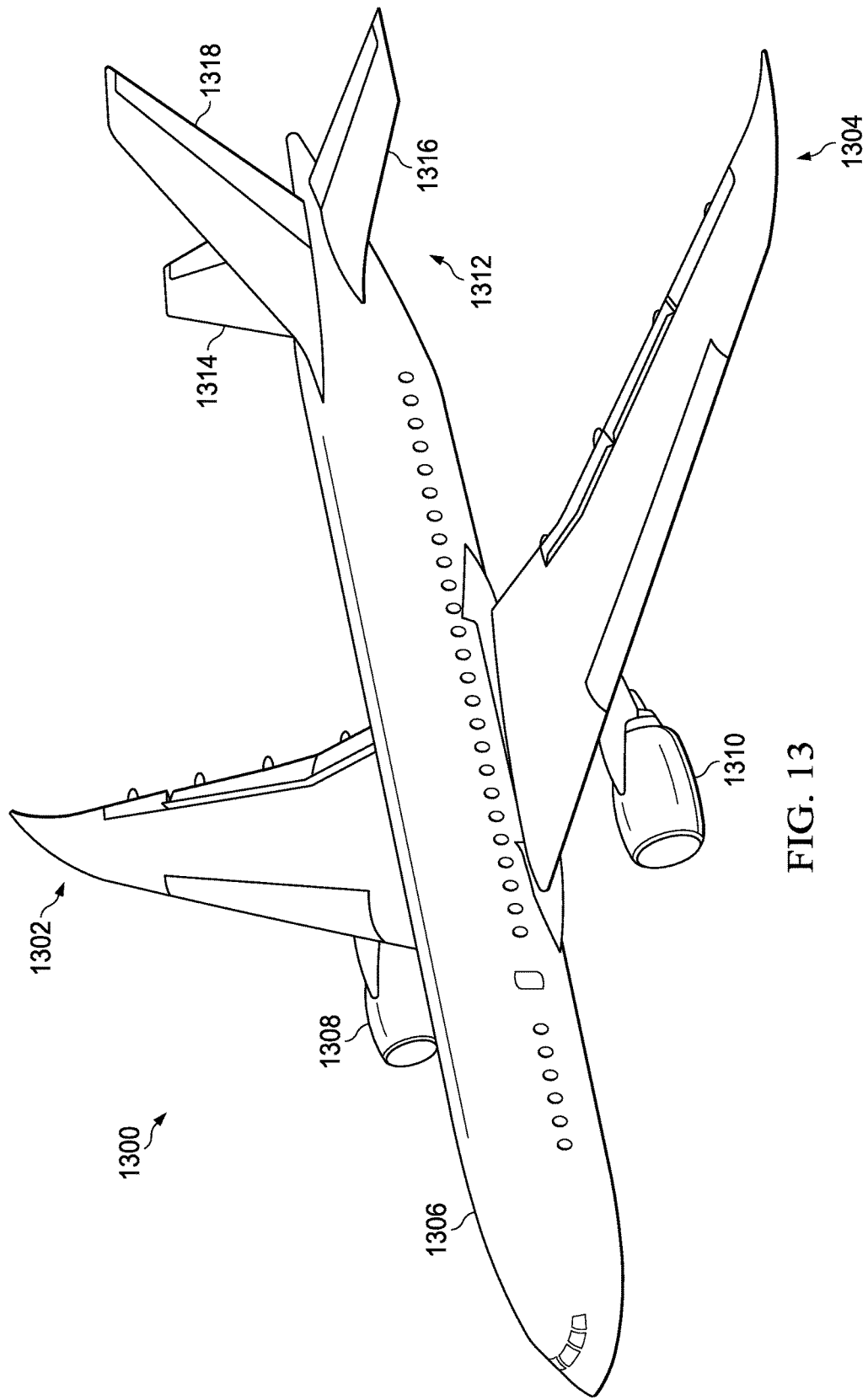
FIG. 13 is an illustration of an aircraft, in accordance with an illustrative embodiment.

FIG. 13 illustrates an aircraft, in accordance with an illustrative embodiment. Aircraft 1300 includes wing 1302 and wing 1304 attached to fuselage 1306; engine 1308 attached to wing 1302; and engine 1310 attached to wing 1304. Engine 1310 could also be attached to fuselage 1306. Fuselage 1306 has tail section 1312. Horizontal stabilizer 1314, horizontal stabilizer 1316, and vertical stabilizer 1318 are attached to tail section 1312 of fuselage 1306.

Figure 14:
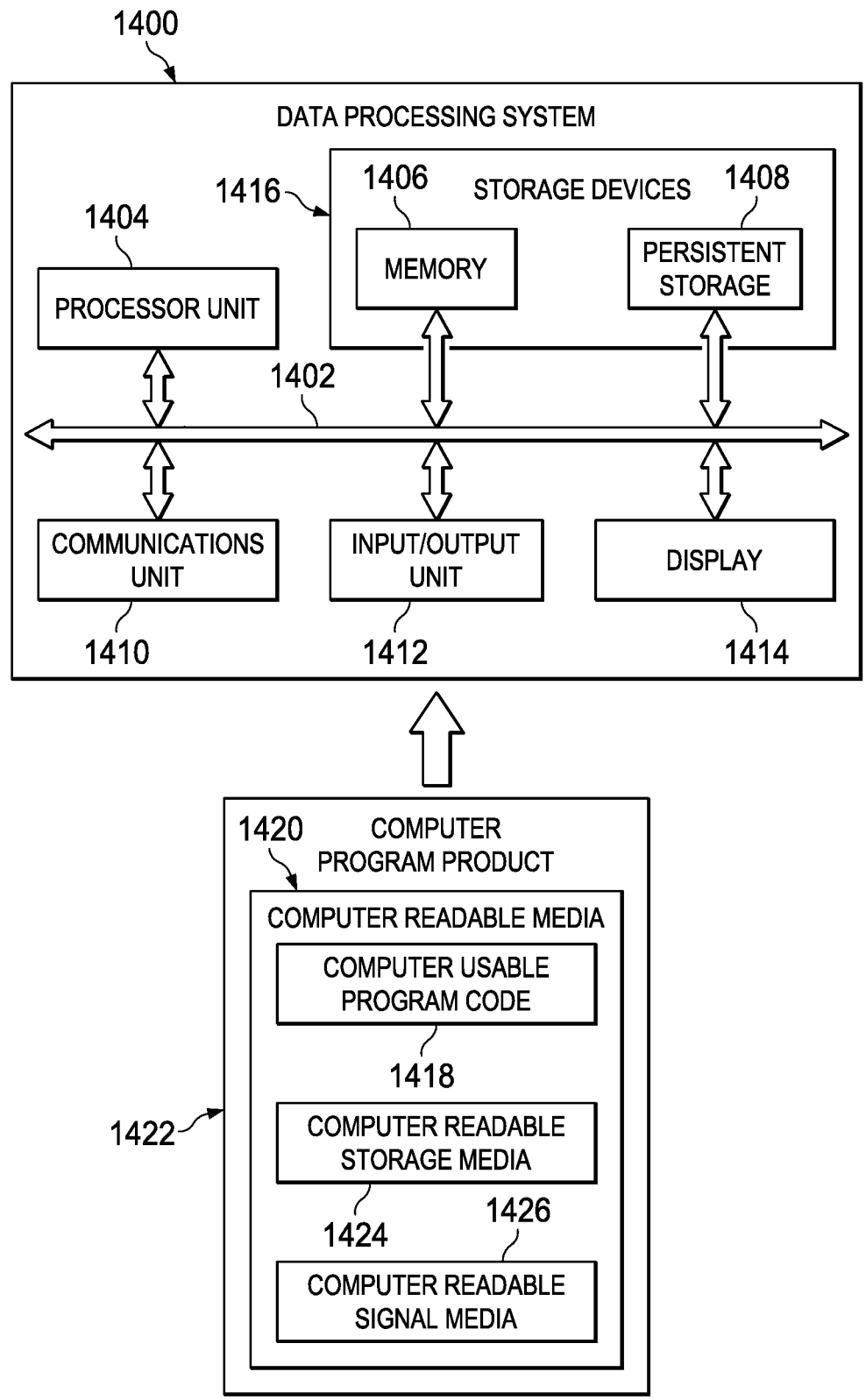
FIG. 14 is an illustration of a block diagram of a data processing system, in accordance with an illustrative embodiment.

A computer, such as data processing system 1400 of FIG. 14, may be inside fuselage 1306, such as in a cabin or cockpit. This computer may store program code for executing any of the methods or techniques described above in order to automatically operate aircraft 1300 as described above.

Turning now to FIG. 14, an illustration of a data processing system is depicted in accordance with an illustrative embodiment. Data processing system 1400 in FIG. 14 is an example of a data processing system that may be used to implement the illustrative embodiments, those described with respect to FIG. 1 through FIG. 13, or any other module or system or process disclosed herein. In this illustrative example, data processing system 1400 includes communications fabric 1402, which provides communications between processor unit 1404, memory 1406, persistent storage 1408, communications unit 1410, input/output (I/O) unit 1412, and display 1414.

Processor unit 1404 serves to execute instructions for software that may be loaded into memory 1406. Thus, for example, software loaded into memory 1406 may be software for executing method 1100 of FIG. 11 or any other method described herein. Processor unit 1404 may be a number of processors, a multi-processor core, or some other type of processor, depending on the particular implementation. A number, as used herein with reference to an item, means one or more items. Further, processor unit 1404 may be implemented using a number of heterogeneous processor systems in which a main processor is present with secondary processors on a single chip. As another illustrative example, processor unit 1404 may be a symmetric multi-processor system containing multiple processors of the same type.

Memory 1406 and persistent storage 1408 are examples of storage devices 1416. A storage device is any piece of hardware that is capable of storing information, such as, for example, without limitation, data, program code in functional form, and/or other suitable information either on a temporary basis and/or a permanent basis. Storage devices 1416 may also be referred to as computer readable storage devices in these examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these examples, provides for communications with other data processing systems or devices. In these examples, communications unit 1410 is a network interface card. Communications unit 1410 may provide communications through the use of either or both physical and wireless communications links.

Input/output (I/O) unit 1412 allows for input and output of data with other devices that may be connected to data processing system 1400. For example, input/output (I/O) unit 1412 may provide a connection for user input through a keyboard, a mouse, and/or some other suitable input device. Further, input/output (I/O) unit 1412 may send output to a printer. Display 1414 provides a mechanism to display information to a user.

Instructions for the operating system, applications, and/or programs may be located in storage devices 1416, which are in communication with processor unit 1404 through communications fabric 1402. In these illustrative examples, the instructions are in a functional form on persistent storage 1408. These instructions may be loaded into memory 1406 for execution by processor unit 1404. The processes of the different embodiments may be performed by processor unit 1404 using computer implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Computer usable program code 1418 is located in a functional form on computer readable media 1420 that is selectively removable and may be loaded onto or transferred to data processing system 1400 for execution by processor unit 1404. Computer usable program code 1418 and computer readable media 1420 form computer program product 1422 in these examples. In one example, computer readable media 1420 may be computer readable storage media 1424 or computer readable signal media 1426. Computer readable storage media 1424 may include, for example, an optical or magnetic disk that is inserted or placed into a drive or other device that is part of persistent storage 1408 for transfer onto a storage device, such as a hard drive, that is part of persistent storage 1408. Computer readable storage media 1424 also may take the form of a persistent storage, such as a hard drive, a thumb drive, or a flash memory, that is connected to data processing system 1400. In some instances, computer readable storage media 1424 may not be removable from data processing system 1400.

Alternatively, computer usable program code 1418 may be transferred to data processing system 1400 using computer readable signal media 1426. Computer readable signal media 1426 may be, for example, a propagated data signal containing computer usable program code 1418. For example, computer readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, computer usable program code 1418 may be downloaded over a network to persistent storage 1408 from another device or data processing system through computer readable signal media 1426 for use within data processing system 1400. For instance, program code stored in a computer readable storage medium in a server data processing system may be downloaded over a network from the server to data processing system 1400. The data processing system providing computer usable program code 1418 may be a server computer, a client computer, or some other device capable of storing and transmitting computer usable program code 1418.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1404 may take the form of a hardware unit that has circuits that are manufactured or configured for a particular use. This type of hardware may perform operations without needing program code to be loaded into a memory from a storage device to be configured to perform the operations.

For example, when processor unit 1404 takes the form of a hardware unit, processor unit 1404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, computer usable program code 1418 may be omitted because the processes for the different embodiments are implemented in a hardware unit.

In still another illustrative example, processor unit 1404 may be implemented using a combination of processors found in computers and hardware units. Processor unit 1404 may have a number of hardware units and a number of processors that are configured to run computer usable program code 1418. With this depicted example, some of the processes may be implemented in the number of hardware units, while other processes may be implemented in the number of processors.

As another example, a storage device in data processing system 1400 is any hardware apparatus that may store data.

Memory 1406, persistent storage 1408, and computer readable media 1420 are examples of storage devices in a tangible form.

In another example, a bus system may be used to implement communications fabric 1402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1406, or a cache, such as found in an interface and memory controller hub that may be present in communications fabric 1402.

Data processing system 1400 may also include an associative memory. The associative memory may be in communication with communications fabric 1402. The associative memory may also be in communication with, or in some illustrative embodiments, be considered part of storage devices 1416.

As used herein, the term "associative memory" refers to a content addressable memory. An associative memory may be considered a plurality of data and a plurality of associations among the plurality of data. The plurality of data and the plurality of associations may be stored in a non-transitory computer readable storage medium. The plurality of data may be collected into associated groups. The associative memory may be configured to be queried based on at least indirect relationships among the plurality of data in addition to direct correlations among the plurality of data. Thus, an associative memory may be configured to be queried based solely on direct relationships, based solely on at least indirect relationships, as well as based on combinations of direct and at least indirect relationships. An associative memory may be a content addressable memory.

Thus, an associative memory may be characterized as a plurality of data and a plurality of associations among the plurality of data. The plurality of data may be collected into associated groups. Further, the associative memory may be configured to be queried based on at least one relationship, selected from a group that includes direct and at least indirect relationships, or from among the plurality of data in addition to direct correlations among the plurality of data. An associative memory may also take the form of software. Thus, an associative memory also may be considered a process by which information is collected into associated groups in the interest of gaining new insight based on relationships rather than direct correlation. An associative memory may also take the form of hardware, such as specialized processors or a field programmable gate array.

As used herein, the term "entity" refers to an object that has a distinct, separate existence, though such existence need not be a material existence. Thus, abstractions and legal constructs may be regarded as entities. As used herein, an entity need not be animate. Associative memories work with entities.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and may be not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of operating an aircraft comprising:
computing an optimal climb rate profile representing optimized fuel consumption by the aircraft during a cruise climb to an optimal altitude where fuel consumption is minimized during a cruise, wherein the optimal climb rate profile is represented on a graph of altitude versus ground distance, and wherein the optimal climb rate profile represents an optimal climb rate;

initiating, after computing the optimal climb rate profile, the cruise climb for the aircraft;

tracking a three-dimensional position of the aircraft using both vertical navigation tracking of the aircraft and lateral navigation tracking of the aircraft, to form tracked information; and adjusting a climb rate using the tracked information such that the climb rate about matches the optimal climb rate, wherein adjusting comprises calculating a flight level change that intercepts and then locks a vertical path of the aircraft to the optimal climb rate profile.

2. The method of claim 1, further comprising:
calculating favorable lateral wind and temperature components as part of the lateral navigation tracking and using the favorable lateral wind and temperature components to further adjust the climb rate.

3. The method of claim 1, wherein the climb rate is between about ten feet per minute and about fifty feet per minute.

4. The method of claim 1, further comprising:
ending the cruise climb upon reaching the optimal altitude.

5. The method of claim 1, further comprising:
automatically selecting a start point and an end point of the cruise climb.

6. The method of claim 1, wherein the cruise climb comprises a negative vertical speed used to track the optimal altitude.

7. The method of claim 1, wherein the climb rate is further maintained at or below one hundred feet per minute.

8. A method of operating an aircraft comprising:
computing an optimal climb rate profile representing optimized fuel consumption by the aircraft during a cruise climb to an optimal altitude where fuel consumption is minimized during a cruise, wherein the optimal climb rate profile is represented on a graph of altitude versus ground distance, and wherein the optimal climb rate profile represents an optimal climb rate;

wherein, before initiating, the aircraft is at an altitude that is above a corresponding altitude for a given ground distance on the optimal climb rate profile at which the aircraft is located;

maintaining, before initiating, the altitude until the aircraft reaches a second ground distance on the optimal climb rate profile that matches the altitude of the aircraft;

initiating, after computing the optimal climb rate profile, the cruise climb for the aircraft;

tracking a three-dimensional position of the aircraft using both vertical navigation tracking of the aircraft and lateral navigation tracking of the aircraft, to form tracked information; and adjusting a climb rate using the tracked information such that the climb rate about matches the optimal climb rate.

9. A method of operating an aircraft comprising:
computing an optimal climb rate profile representing optimized fuel consumption by the aircraft during a cruise climb to an optimal altitude where fuel consumption is minimized during a cruise, wherein the optimal climb rate profile is represented on a graph of altitude versus ground distance, and wherein the optimal climb rate profile represents an optimal climb rate;

wherein, before initiating, the aircraft is at an altitude that is below a corresponding altitude for a given ground distance on the optimal climb rate profile at which the aircraft is located;

climbing, before initiating, at a climb rate greater than one hundred feet per minute but less than one thousand feet per minute, until the aircraft reaches a second altitude that corresponds to a second ground distance of the aircraft that is on the optimal climb rate profile;

initiating, after computing the optimal climb rate profile, the cruise climb for the aircraft;

tracking a three-dimensional position of the aircraft using both vertical navigation tracking of the aircraft and lateral navigation tracking of the aircraft, to form tracked information; and adjusting the climb rate using the tracked information such that the climb rate about matches the optimal climb rate.

10. An aircraft comprising:
a fuselage;
a wing connected to the fuselage;
an engine connected to one of the wing and the fuselage; and
a computer located inside the fuselage and in communication with controls for operating the aircraft, the computer storing program code, which when executed by a processor of the computer, executes a method for automatically using the controls to operate the aircraft, the program code comprising:

program code for computing an optimal climb rate profile representing optimized fuel consumption by the aircraft during a cruise climb to an optimal altitude where fuel consumption is minimized during a cruise, wherein the optimal climb rate profile is represented on a graph of altitude versus ground distance, and wherein the optimal climb rate profile represents an optimal climb rate;

program code for initiating, after computing, the cruise climb for the aircraft;

program code for tracking a three-dimensional position of the aircraft using both vertical navigation tracking of the aircraft and lateral navigation tracking of the aircraft, to form tracked information; and program code for adjusting a climb rate using the tracked information such that the climb rate about matches the optimal climb rate, wherein the program code for adjusting comprises program code for calculating a flight level change that intercepts and then locks a vertical path of the aircraft to the optimal climb rate profile.

11. The aircraft of claim 10, wherein the program code further comprises:
program code for calculating favorable lateral wind and temperature components as part of the lateral navigation tracking and using the favorable lateral wind and temperature components to further adjust the climb rate.

12. The aircraft of claim 10, wherein the climb rate is between about ten feet per minute and about fifty feet per minute.

13. The aircraft of claim 10, wherein the program code is configured such that the climb rate is further maintained at or below one hundred feet per minute.

14. An aircraft comprising:
a fuselage;
a wing connected to the fuselage;
an engine connected to one of the wing and the fuselage; and a computer located inside the fuselage and in communication with controls for operating the aircraft, the computer storing program code, which when executed by a processor of the computer, executes a method for automatically using the controls to operate the aircraft, the program code comprising:

program code for computing an optimal climb rate profile representing optimized fuel consumption by the aircraft during a cruise climb to an optimal altitude where fuel consumption is minimized during a cruise, wherein the optimal climb rate profile is represented on a graph of altitude versus ground distance, and wherein the optimal climb rate profile represents an optimal climb rate;

wherein, before initiating, the aircraft is at an altitude that is above a corresponding altitude for a given ground distance on the optimal climb rate profile at which the aircraft is located;

program code for maintaining, before initiating, the altitude until the aircraft reaches a second ground distance on the optimal climb rate profile that matches the altitude of the aircraft;

program code for initiating, after computing, the cruise climb for the aircraft;

program code for tracking a three-dimensional position of the aircraft using both vertical navigation tracking of the aircraft and lateral navigation tracking of the aircraft, to form tracked information; and program code for adjusting a climb rate using the tracked information such that the climb rate about matches the optimal climb rate.

15. An aircraft comprising:
a fuselage;
a wing connected to the fuselage;
an engine connected to one of the wing and the fuselage; and a computer located inside the fuselage and in communication with controls for operating the aircraft, the computer storing program code, which when executed by a processor of the computer, executes a method for automatically using the controls to operate the aircraft, the program code comprising:

program code for computing an optimal climb rate profile representing optimized fuel consumption by the aircraft during a cruise climb to an optimal altitude where fuel consumption is minimized during a cruise, wherein the optimal climb rate profile is represented on a graph of altitude versus ground distance, and wherein the optimal climb rate profile represents an optimal climb rate;

wherein, before initiating, the aircraft is at an altitude that is below a corresponding altitude for a given ground distance on the optimal climb rate profile at which the aircraft is located;

program code for climbing, before initiating, at a rate greater than one hundred feet per minute but less than one thousand feet per minute, until the aircraft reaches a second altitude that corresponds to a second ground distance of the aircraft that is on the optimal climb rate profile;

program code for initiating, after computing, the cruise climb for the aircraft;

program code for tracking a three-dimensional position of the aircraft using both vertical navigation tracking of the aircraft and lateral navigation tracking of the aircraft, to form tracked information; and program code for adjusting a climb rate using the tracked information such that the climb rate about matches the optimal climb rate.

\* \* \* \* \*